(12) United States Patent
Mathur et al.

(10) Patent No.: US 6,947,917 B1
(45) Date of Patent: Sep. 20, 2005

(54) ADVANCED RECIPE—A KNOWLEDGE BASED INFORMATION SYSTEM FOR PRODUCTION PROCESSES

(75) Inventors: Anoop Kumar Mathur, Shoreview, MN (US); Vipin Gopal, New Brighton, MN (US); Jan Jelinek, Plymouth, MN (US); Tariq Samad, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/549,620

(22) Filed: Apr. 14, 2000

(51) Int. Cl.[7] .............................. G06F 17/00; G06N 5/00
(52) U.S. Cl. .............................. 706/45; 706/46; 706/11
(58) Field of Search .............................. 706/46, 11, 45

(56) References Cited

U.S. PATENT DOCUMENTS

| | | | |
|---|---|---|---|
| 5,058,043 A | 10/1991 | Skeirik | 700/167 |
| 5,495,417 A | 2/1996 | Fuduka et al. | 700/121 |
| 5,631,825 A | 5/1997 | van Weele et al. | 700/83 |
| 5,963,447 A | * 10/1999 | Kohn et al. | 700/181 |

FOREIGN PATENT DOCUMENTS

| | | |
|---|---|---|
| EP | 0553571 A | 8/1993 |
| WO | 9414106 A | 6/1994 |

OTHER PUBLICATIONS

Amant, R., "IDA Assistance for Mixed–Initiative Planning", Technical Report TR–99–12, North Carolina State University, Raleigh, NC,(1999),pp. 1–10.

Goldman, R., et al. ,"Integrated Task Representation for Indirect Interaction Position Paper", *AAAi SSS Computational Models for Mixed–Initiative Interaction*, Stanford, CA(1997),pp. 50–56.

Haigh, K., "Situation–Dependent Learning for Interleaved Planning and Robot Execution", Ph.D Thesis, Carnegie Mellon University, Pittsburgh, PA,(1998),pp. 1–172.

Sanderson, P., "Work Domain Analysis Workbench: Supporting Cognitive Work Analysis as a Systematic Practice", *Proceedings of the Human Factors and Ergonomics Society 43rd Annual Meeting*, Santa Monica, CA,(1999),pp. 323–327.

Vicente, K., *Cognitive Work Analysis: Towards safe, productive, and healthy computer–based work*, (1999),1–392.

* cited by examiner

Primary Examiner—Joseph P. Hirl
(74) Attorney, Agent, or Firm—Schwegman, Lundberg, Woessner & Kluth

(57) ABSTRACT

An novel recipe that embodies a higher level description than currently used in the industry is described. The novel recipe is referred to herein as an "advanced recipe." A traditional recipe consists of a general set of instructions called a 'recipe' which is used to make a product. An advanced recipe integrates the intent behind these set of instructions. A novel knowledge management system for capturing, integrating, and using broad knowledge is also described below. Some embodiments of the knowledge management system enable modification of recipes for maximizing the overall processing objectives. An example embodiment of the knowledge management system comprises a Knowledge Builder, a Structured Knowledge Repository, and a Decision Maker.

37 Claims, 5 Drawing Sheets

FIG. 5

| Functional Purpose | Priority Measures | Purpose-Related Functions | Equipment Related Functions | Physical Equipment |
|---|---|---|---|---|

ADVANCED RECIPE— A KNOWLEDGE BASED INFORMATION SYSTEM FOR PRODUCTION PROCESSES

FIELD OF THE INVENTION

The present invention relates generally to process control and more specifically to a knowledge based information system for process control.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000 Honeywell Inc., All Rights Reserved.

BACKGROUND OF THE INVENTION

Batch processing in the United States represents a huge industry segment. Batch processing involves producing fixed quantities (batches) of product by combining ingredients and treatments according to defined sequences of steps called "recipes" or "production recipes." Presently, five percent of the United States gross national product is based on industries that rely on batch manufacturing (including chemical, food and beverage, and pharmaceutical industries).

Recipes define how to make a company's products, whether the company is manufacturing specialty chemicals, food and beverages, pharmaceuticals, or consumer goods for example. Today, batch processing often involves using the same recipe for the same product, even under varying process conditions. Because recipes are costly to develop and difficult to tailor for varying processing conditions or production requirements, successful recipes are reused repeatedly in fixed form and for fixed batch sizes, even when this results in undesirable batch-to-batch quality variations and larger inventories than necessary. Even when the batch can accommodate a different—and economically more viable—recipe, the effort and uncertainty involved in modifying the current recipe is considered too risky or too time-consuming to attempt. It is risky because the scientific and engineering knowledge required to modify the recipe is complex and is not available as part of the recipe. In fact, this knowledge is often lost as recipes make the transition from laboratory to pilot plant to production plant. For example, a recipe instruction such as "Control heat rate to <2° C./min" may have been determined from complex scientific reasoning such as: "Control heat rate to limit the gas evolution to less than 1 L/min because higher gas evolution rates can cause cracking of the treated product, especially if the raw material contains moisture." Today, however, this complex instruction is reduced to a simple one, to cover all situations.

The recipes used in batch manufacturing today are merely a set of instructions that do not include the scientific or engineering knowledge that is the basis for these actions. Because the underlying knowledge (for example, heat rate is a function of gas evolution rate and initial moisture content; gas evolution rate is described by first order kinetics) and desired state (for example, no cracking, moisture content less than 0.01%), is not included, and often lost, making changes to the recipes is usually a trial-and-error operation.

Today, recipes are generally not modified. Recipes are initially developed and implemented for a specific batch size. Scaling up a recipe from a pilot to production is a challenging and time-consuming task. Once the recipe is proven in production runs, it is difficult to change the quantity of material produced. Furthermore, many recipes, especially those involving chemical reactions, do not scale linearly.

However, using a fixed recipe for all batches leads to products of inconsistent quality. Batch processing is a complex activity where variability in processing conditions is almost certain and the ability to modify a recipe is desirable. Therefore, there is a need to tailor a recipe for the varying processing conditions and production requirements for a specific batch.

SUMMARY OF THE INVENTION

One aspect of the present invention is a method of tailoring a production recipe to specific plant and business needs. This is enabled by the use of an "advanced recipe." The method comprises receiving knowledge from one or more sources. The method further comprises generating through computer automated operations a recipe comprising a set of actions and the purpose of the underlying actions.

An additional aspect of the present invention is a computerized system comprising a Knowledge Builder to derive from multiple knowledge sources. The computerized system further comprises a Structured Knowledge Repository to store and organize the knowledge, and a Decision Maker to use the knowledge stored in the structured knowledge repository to identify one or more modifications of recipe steps.

Another aspect of the present invention is a computer-readable medium having computer-executable instructions for a method of managing a production % process. The method comprises receiving one or more desired purposes for the production process and receiving a recipe. The method further comprises generating an advanced recipe comprising a set of actions and the purpose of the underlying process.

Still other and further embodiments, aspects and advantages of the invention will become apparent by reference to the drawings and by reading the following detailed description.

BRIEF DESCRIPTION OF THE DRAWINGS

FIG. 5 is a diagram of a structured representation for the drying example shown in FIG. 1.

DESCRIPTION OF THE EMBODIMENTS

A novel system and method for tailoring production recipes to changing processing and production needs are described. In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention. It is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

An novel recipe that embodies a higher level description than currently used in the industry is described. The novel recipe is referred to herein as an "advanced recipe." Some embodiments of the advanced recipe, as further described below, comprise an integrated set of information containing a set of actions and their underlying processing purpose. A traditional recipe consists of a general set of instructions called a 'recipe' which is used to make a product. An advanced recipe integrates the intent behind the set of instructions. The following detailed description describes example embodiments of methods to annotate a recipe with user intent information from different sources to generate an advanced recipe. Example embodiments of methods to modify advanced recipes for varying processing requirements and production conditions are also described. Additionally, embodiments of a system architecture for implementing and delivering an advanced recipe are described.

A novel knowledge management system for capturing, integrating, and using broad knowledge is also described below. Some embodiments of the knowledge management system enable modification of recipes for maximizing the overall processing objectives. An example embodiment of the knowledge management system comprises a Knowledge Builder, a Structured Knowledge Repository, and a Decision Maker.

Figure 1:
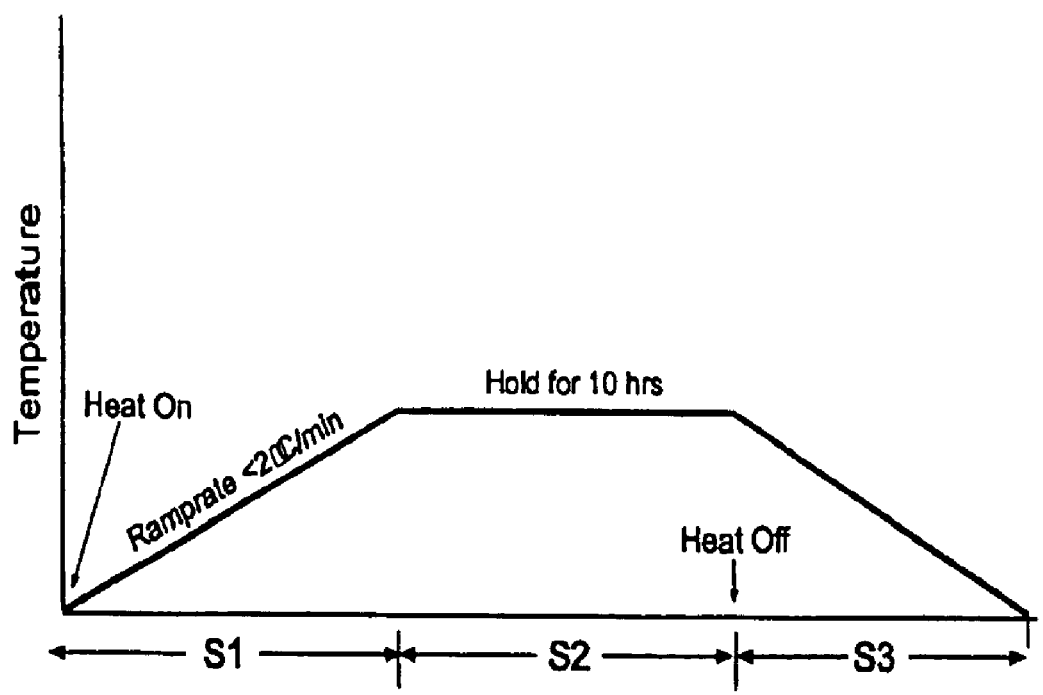
FIG. 1 is a graph of a recipe for a drying process of an example scenario.

Throughout the following detailed description, an example batch process manufacturing scenario is used to describe some embodiments of the invention. The example scenario is for a drying process. FIG. 1 is a graph of a recipe for a drying process of an example scenario. As shown in FIG. 1, the recipe contains three segments. Each segment of the recipe illustrated in FIG. 1 shows how the temperature should be controlled to achieve the desired product dryness, but it does not indicate what the desired state of the product is at, upon execution of the recipe segment. For example, the first segment (S1) of the recipe may require the temperature of the vessel to be raised at a constant rate until it reaches an indicated endpoint. The desired state of this segment may be to remove absorbed gases and moisture form the product without product cracking. The second segment (S2) holds the vessel temperature constant to ensure that the product is completely dry. The third segment (S3) begins to cool the vessel temperature. According to previous practice, the recipe tells the process operator how long each segment should last; but the recipe does not include product characteristics or states that should be associated with each segment. However, some embodiments of the advanced recipe of the present invention desirably integrate such product characteristics and/or desired states with the set of instructions provided by the original recipe.

Hardware and Operating Environment. This section provides an overview of the hardware and the operating environment in conjunction with which embodiments of the invention can be practiced.

Figure 2:
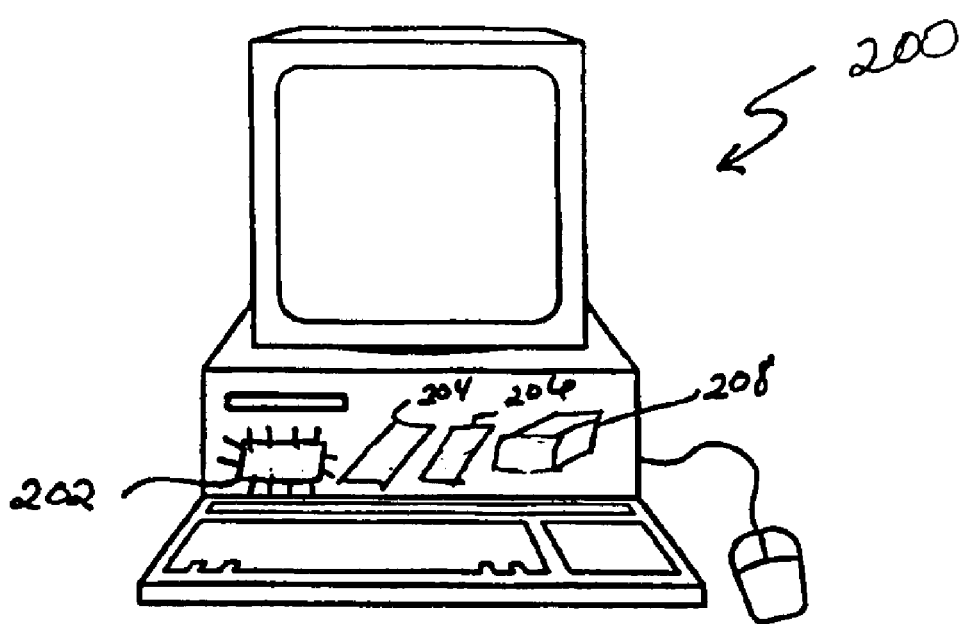
FIG. 2 is a diagram of a typical hardware and operating environment in conjunction with which embodiments of the invention may be implemented.

FIG. 2 is a diagram of a computerized system in conjunction with which embodiments of the invention may be implemented. Computer 200 includes a processor 202, random-access memory (RAM) 204, read-only memory (ROM) 206, and one or more storage devices 208, such as a hard disk drive, a floppy disk drive (into which a floppy disk can be inserted), an optical disk drive, a tape cartridge drive and the like. RAM 204 and ROM 206 are collectively referred to as the memory of computer. The memory, hard drives, floppy disks, and the like, are types of computer-readable mediums. The computer-readable mediums store instructions for execution by the processor 202. The instructions are provided to the processor 202 over a bus. The invention is not particularly limited to any type of computer 200. The construction and operation of such computers are well known within the art.

In one embodiment, the knowledge based information system for production processes is incorporated into software executing on a computer, such as the computer 200. As further described below, one embodiment of the software program receives knowledge from varied sources and creates or modifies advanced recipes. The software program is developed using any high level language. Those skilled in the art will recognize that any hardware and operating system may be employed without diverting from the scope of the present invention.

The hardware and operating environment in conjunction with which embodiments of the invention can be practiced has been described.

Figure 3:
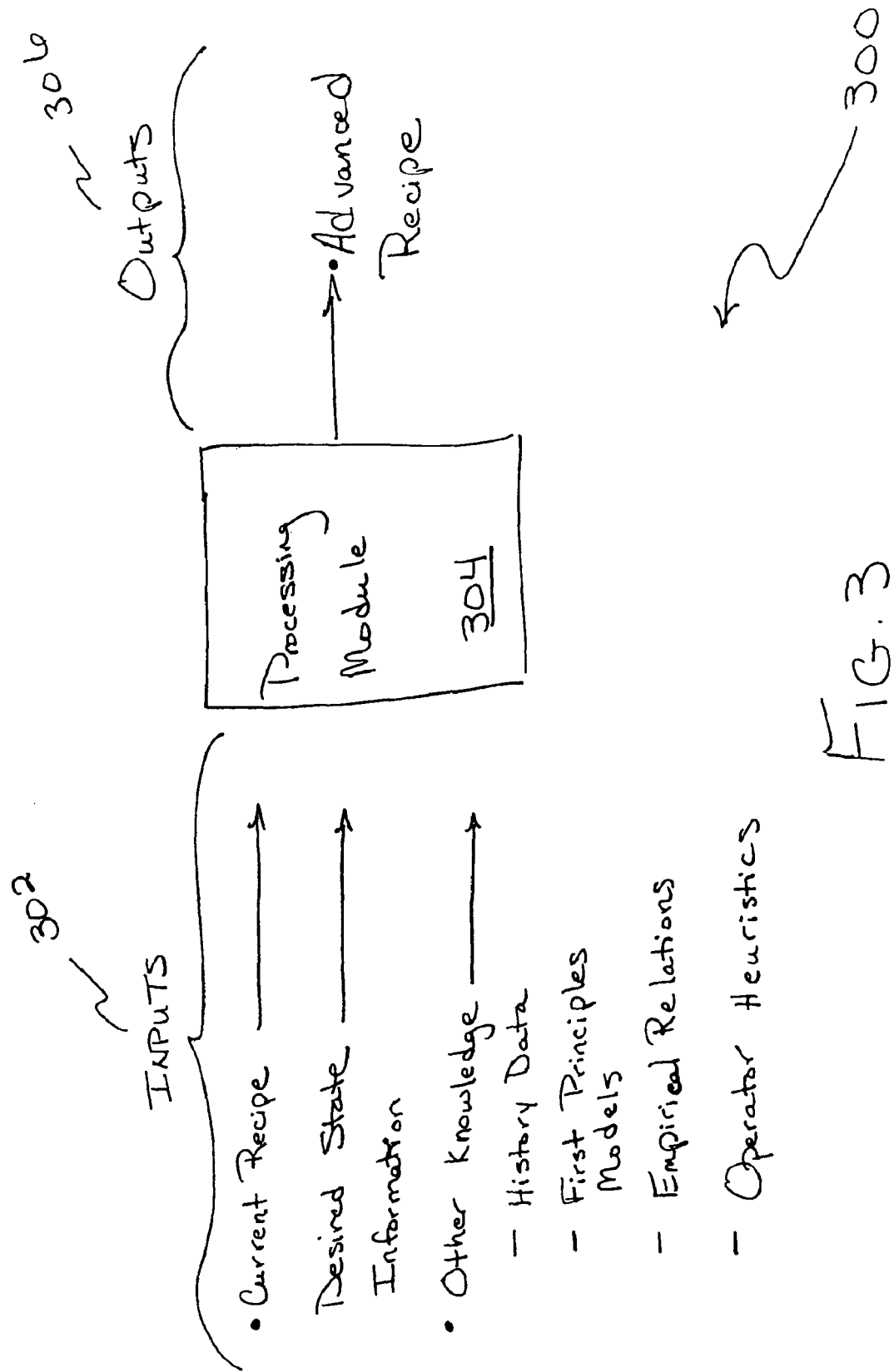
FIG. 3 is a block diagram of a system level overview of an example embodiment of the invention.

System Level Overview. A system level overview of the operation of an example embodiment of the invention for use in a batch process application is described by reference to FIG. 3. The knowledge-based information system 300, as shown in FIG. 3, comprises one or more inputs 302, a processing module 304, and one or more outputs 306.

The inputs 302 to the knowledge-based information system 300 represent a set of actions (the current recipe), desired state information for a process, and knowledge from varied sources. The following list of example knowledge types is not inclusive, but represents examples of the knowledge sources for inputs 302. Example knowledge sources include, but are not limited to, first-principles models, historical data, empirical data and heuristics. First-principles models describe system behavior mathematically based on fundamental physical and chemical understanding. Common forms of first-principles models include algebraic equations, ordinary differential equations, partial differential equations, and differential algebraic equations. Many batch manufacturers have huge bases of historical data, such as operating parameters and intermediate and final product quality, about process runs that are collected during experiments and normal system operation. Data from the lab, pilot plant, and manufacturing plant, and statistical models derived from the data fall in this category. Heuristics are formal representations of experiential knowledge, typically rule-based, gained by scientists, engineers, or plant operators.

Output 306 represents a result produced by the processing module 304 using the inputs 302. An example output is an advanced recipe. An advanced recipe is an integrated set of information containing the set of actions and their underlying processing purpose. The set of actions that describe a batch manufacturing process is a recipe. The purpose of the actions is referred to herein as the desired-state of the system. The desired state in a process is arrived at using information from different knowledge sources. Thus, a recipe that is annotated with desired state information creates an advanced recipe. (RECIPE+DESIRED STATE= ADVANCED RECIPE.) One of skill in the art will recognize that the inputs 302 and outputs 306 will differ by the application and the invention is not limited to a particular set of inputs and outputs.

The processing module 304 comprises program modules that perform functions to generate a recipe comprising a set of actions and the purpose of the underlying process. Generally, program modules include routines, programs, objects, components, data structures, etc., that perform particular functions or implement particular abstract data types.

Figure 4:
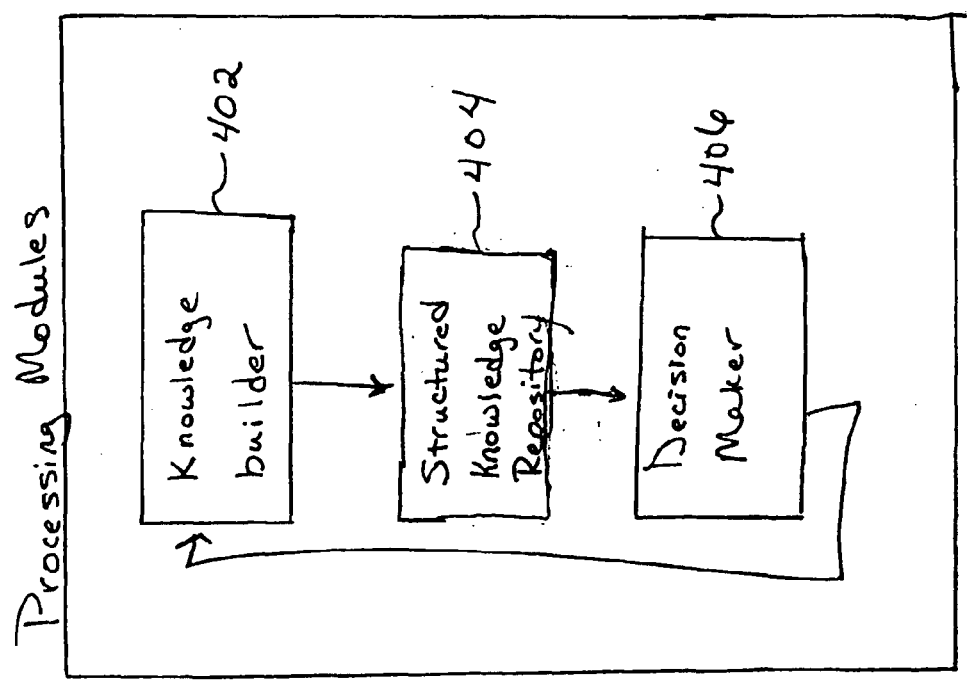
FIG. 4 is a more detailed block diagram of the processing modules of FIG. 3 according to an example embodiment of the invention.

FIG. 4 is a more detailed block diagram of the processing modules of FIG. 3 according to an example embodiment of the invention. In the example embodiment shown in FIG. 4, processing modules for a knowledge-based information system comprise a Knowledge Builder 402, a Structured Knowledge Repository 404, and a Decision Maker 406. In one embodiment, the Knowledge Builder 402 derives high-level representations of knowledge through aggregation and correlation of multiple knowledge sources. The knowledge builder 402 stores the high-level representations of knowledge in the Structured Knowledge Repository 404. The Decision Maker 406 uses this knowledge to evaluate and choose the optimal modification of recipe steps for a batch processing situation.

Using the drying example shown in FIG. 1, an example scenario for a knowledge-based information system is as follows:

In the example scenario, a post-production analysis indicates that the residual moisture in a product is unacceptable. The Knowledge Builder 402 of one embodiment of the present invention is used to analyze process run data, history data, and first-principle models for temperature variability, total heat input per pound of product, and lab analysis of input raw material. The knowledge builder 402 stores the newly learned rules and patterns in the structured knowledge repository 404. Using the desired-state information provided by a user, along with the domain knowledge generated by the Knowledge Builder 402, the Decision Maker 406 creates a new recipe, suggesting, for example, to increase the heating rate and/or hold time.

The system level overview of the operation of an example embodiment of the invention has been described in this section of the detailed description. In the following sections, example embodiments of the Knowledge Builder 402, the Structured Knowledge Repository 404, and the Decision Maker 406 are described in more detail.

Knowledge Builder. The Knowledge Builder 402 is an engine for transforming unstructured knowledge into a structured, operational form. The Knowledge Builder 402 processes many forms of knowledge including, but not limited to, mathematical models, expert rules, and raw data from previous batch manufacturing runs.

In the drying example introduced by reference to FIG. 1 above, the rate of gas evolution from the batch may be due to a chemical reaction. The Knowledge Builder 402 analyzes knowledge sources and builds an operational representation of gas evolution at different temperatures, along with appropriate symbolic qualitative or heuristic information such as: "Heat rate will increase with increasing chemical reaction rate" and "Gas evolution rate will increase with increasing temperature." The Knowledge Builder 402 extracts knowledge and transforms the knowledge into an operational representation that the Decision Maker 406 can use to create and modify Advanced Recipes.

The Knowledge Builder 402 is capable of extracting a variety of knowledge types from multiple sources. In one embodiment, the Knowledge Builder 402 is also scalable to incorporate new knowledge and knowledge extraction techniques. Previously, no method was effective for acquiring all types of knowledge sources relevant in batch processing. A further difficulty for batch automation is that the information represented in each of the knowledge sources may be incomplete, and often, not completely correct.

In one embodiment, the Knowledge Builder 402 is implemented using multiple Machine Learning (ML) techniques to create a synergistic, cohesive knowledge integration technology. The Knowledge Builder 402 is optionally supported by a novel scaffolding of knowledge in the Structured Knowledge Repository as described in the following section. To exploit the variety of batch processing knowledge sources, the Knowledge Builder 402 combines symbolic, empirical, and hybrid approaches. A symbolic learning approach can be loosely described as the extraction of reasons for the outcome of an event (why). Empirical approaches extract "what happened" information from events. Hybrid approaches combine the two in different fashions.

Previously, machine learning incorporated only a few ML techniques, creating 'monolithic' learning systems by integrating the techniques at the algorithm level, changing the basic functioning of the algorithm, or changing how the knowledge is used (often requiring the input knowledge representations to be the same). This approach limits the number of techniques that can be combined. A discussion of machine learning is provided in Haigh, Karen Zita, *Situation-Dependent Learning for Interleaved Planning and Robot Execution*, PhD thesis, Carnegie Mellon University, Pittsburgh, Pa., 1998 which is herein incorporated by reference. Additional discussion of machine learning is provided in St. Amant, Robert, 1999, IDA assistance for mixed-initiative planning, Technical Report TR-99-12, North Carolina State University, Raleigh, N.C., 1999 which is incorporated herein by reference.

The Knowledge Builder 402 exploits the capabilities of each of the machine learning techniques and allows each to operate independently, extracting exactly the knowledge type for which it is best suited, using exactly the input representations it would normally require, and outputting essentially the same representation it normally would. In one embodiment, the Knowledge Builder 402 works with unstructured knowledge using several learning approaches including, but not limited to, the following three approaches.

Explanation-based learning (EBL)—This symbolic approach analyzes each step in a process to extract the key features that explain the results of that step. EBL relies on an a priori domain theory to identify the key features and to generalize them into an operational form. Essentially, EBL finds the useful operational truth between first-principles models and specific experimental data.

Memory Based Learning (MBL)—This empirical technique constructs models from experimental data. MBL looks for a small set of the most similar experiences, then uses locally weighted regression to generate a prediction for what will happen. This technique accurately fits nonlinear functions and is based on strong statistical foundations.

Situation-dependent learning (SDL)—This approach combines the symbolic approach with the empirical approach, using symbolic features to predict data signals and action outcomes. The data is annotated with detailed contextual descriptions, then generalized to predict outcomes. It determines the value (or signal) statistically from current conditions.

Process knowledge is sometimes either incomplete or inaccurate. Systems should be capable of learning by experimentation or by feedback from the user. To do this, the Knowledge Builder 402 uses methods that are enabled by feedback from the Decision Maker 406 including, but not limited to, the following two approaches:

Plan critiquing—An effective interactive method for obtaining knowledge from an expert. The learning system presents a proposed plan and the expert makes it consistent with his knowledge of the domain. The learner creates rules that capture the context of the expert's decision; with time, the learner will mimic the expert. The Decision Maker's mixed-initiative planning provides an intuitive foundation for this symbolic ML approach.

Learning by experimentation—Experimentation is vital for effective learning and is a very powerful tool for refining scientific theories. The learner can refine domain knowledge through direct interaction with the environment. Learning is selective and task-directed; it is triggered when missing knowledge is needed to perform the current task. Given the feedback data from the new experiment, any of the other learning approaches can be used to extract relevant information.

Thus, example embodiments of the Knowledge Builder 402 extract knowledge from multiple sources through different Machine Learning techniques acting independently from each other. These Machine Learning techniques can be added incrementally. Example embodiments of the Knowledge Builder 402 are also capable of learning by experimentation or by feedback from the user. By using the semantic information captured in the Structured Knowledge Repository 404 (described below), the Decision Maker 406 integrates the results of the machine learning approaches, such as the machine learning approaches described above, to exploit the strengths and minimize the weaknesses of different machine learning approaches.

Structured Knowledge Repository. While the benefits of exploiting different knowledge sources is evident, it also raises another challenge: not only are the ML techniques extracting knowledge from different input representations, they generate different output knowledge representations as well. Furthermore, they will each derive pieces of the overall puzzle represented by how to accomplish a wide variety of desired goals in the domain of batch processing. The Structured Knowledge Repository (SKR) 404 provides a mechanism for organizing this disparate knowledge for storage and for retrieving and integrating it for novel purposes in the future.

In one embodiment, the Structured Knowledge Repository (SKR) 404 leverages and extends recent developments in the area of Cognitive Work Analysis (CWA) to organize knowledge into an SKR and to navigate through the repository to provide decisions. CWA techniques provide templates for structuring domain analysis, capturing knowledge about constraints and capabilities, and relating that knowledge in a scaffolding that shows what information must be obtained to understand how and why work is performed in the way it is. The scaffolding provides a structure into which information can be placed; this helps to identify which questions are answered and to index information for future reference. Because the techniques provide a structure based on the functionality of the domain, the results can be put to many uses, including sensor deployment, optimization, and adaptation and scaling of existing process knowledge. A discussion of cognitive work analysis is provided in Sanderson, P. M., Eggleston, R., Skilton, W., & Cameron, S. (1999), Work Domain Analysis Workbench: Supporting cognitive work analysis as a systematic practice. In *Proceedings of the Human Factors and Ergonomics Society 43rd Annual Meeting* (pp. 323–327). Santa Monica, Calif.: Human Factors and Ergonomics Society, and additional discussion is in Vicente, K. J. (1999), *Cognitive work analysis: Towards safe, productive, and healthy computer-based work*, Mahwah, N.J.: Lawrence Erlbaum Associates both of which are herein incorporated by reference.

In an example embodiment, the abstraction-decomposition space (ADS) technique from CWA is used to support an analysis of a physical domain and show how functional purposes can be achieved within the constraints using the capabilities of the physical and functional entities of the process. The ADS analysis is two-dimensional, analyzing both the means-ends relationships and the part-whole decomposition of the system. In one embodiment, the means-ends dimension of ADS is used to represent functional links from physical equipment and their states all the way to the functional goals of the proposed system. In another embodiment, the part-whole dimension of the ADS is used to decompose steps in a batch process and describe their functions. A structured representation for the drying example (FIG. 1) is shown in FIG. 5.

Each segment of the example process in FIG. 5 describes a desired-state at various levels of means-ends abstraction. This representation structures and maintains pointers to the knowledge derived by the techniques described above for the Knowledge Builder 402. These levels of abstraction, when navigated upward, indicate why the temperature should be controlled to achieve the desired product dryness. For example, the first segment (S1) requires the temperature of the vessel to be raised at a constant rate until it reaches an indicated endpoint. It also illustrates that a constraint on the desired-state of this segment is to remove absorbed gases and moisture from the product without product cracking. Similarly, navigating the representation downward shows how a desired goal can be accomplished. The goal of S2 is to ensure that the product is completely dry; this is accomplished by holding the vessel temperature constant. Finally, note that this representation is not a recipe, but rather a general aggregation and structuring of the knowledge required to produce a set of recipes for achieving the functional purpose 'Dry product Z' under a broad set of initial conditions.

The Knowledge Builder 402 identifies and stores in the Structured Knowledge Repository 404 information about the extracted knowledge such as the types of recipes to which it can be applied, the range of specification variations it covers, how to compute the changes recommended for the recipe, and the estimated "confidence" in the quality of the suggested action for a particular case. For example, an action could suggest reducing the temperature ramp rate in the initial material heat-up phase when batches are smaller. The recommended ramp rate would be a function of the desired batch size and material parameters. Specialized operators could be developed for specifications/requirements that are repeatedly encountered.

As shown in FIG. 5, the 'general' knowledge about how to accomplish desired purposes in the batch process of interest to a particular enterprise is more completely represented at the first three layers of the ADS representation (shown as the upper three layers in FIG. 5). Specific knowledge about the equipment and its status at any given plant is more appropriately represented at the bottom two layers of the ADS as shown in FIG. 5. To answer a specific question for a specific plant (How do I make 85,000 kg given my specific equipment, the status of materials, etc. using a recipe designed for 100,000 kg?), seamless integration of these two types of knowledge should be facilitated.

This separation of the specific plant representation from the higher level functional knowledge about the functions to be accomplished in a recipe provides representational power, allowing the general knowledge about how functions relate to overall goals to remain relatively static, but to make it adaptable to the specific needs of a specific plant when queried. Much of the plant-specific information is retained from one recipe-generation effort to another, and a formal, structured format makes these requirements easier to acquire, develop in phases and change, directly increasing the quality and accuracy of the information. Since much of this information will change only very slowly, preserving site-specific context information reduces the user's burden of specifying a query. More details on the process of querying the Knowledge Builder and its Structured Representation are provided in the description of the Decision Maker below.

In one embodiment, the S88 standards will be used for recipe models, data structures, and language guidelines. Part 1, published in 1995, defines different model types and standardizes terminology used in batch control. Process, physical, and recipe models were defined in Part 1. Part 2 deals with data structures and guidelines for languages. It defines data models that describe batch control as applied to process industries, data structures for facilitating communications within and between batch control implementations, and language guidelines for representing recipes.

Thus, the Structured Knowledge Repository (SKR) 404 provides a mechanism for organizing disparate knowledge for storage and for retrieving and integrating it. The SKR 404 is designed specifically for user interaction and manipulation with the proposed CWA. Thus plant engineers can check or traverse through structured knowledge.

Decision Maker. In one embodiment, the Decision Maker 406 interprets production and process goals from the system or the user and provides one or more Advanced Recipes and other outputs. These outputs are displayed to the user to act on, revise or modify, and when a final recipe is decided on, the computed actions can be implemented in the controller. Whereas the Structured Knowledge Repository 404 organizes knowledge and provides links between specific pieces of information and the functional purposes to which it can be put, the Decision Maker 406 actually assembles that knowledge into an answer to a query—in the form of a recipe modification that meets desired goals and constraints.

The Decision Maker 406 is provides optimal recipe modifications based on the knowledge stored in the Structured Knowledge Repository 404. The Decision Maker 406 also provides a feedback path for continuous learning from users or experimentation and provides one or more solutions if requested. Users may want to inspect alternate approaches to achieve a goal.

In an example embodiment, the Decision Maker 406 is based on the Mixed-Initiative Planning paradigm. Mixed-initiative planning is a framework that allows a human user to interact with and guide an automated planner. The Decision Maker 406 will take decision-making guidance from knowledge in the Structured Knowledge Repository 404 and from the user. A more detailed discussion of mixed-initiative planning is provided in Goldman, Robert P., Guerlain, Stephanie, Miller, Christopher, and Musliner, David J. (1996) "Integrated Task Representation for Indirect Interaction Position Paper," AAAI SSS Computational Models for Mixed-Initiative Interaction, Stanford, Calif., March 1997 which is herein incorporated by reference.

As a baseline, the planner generates possible scenarios that use the information in the Structured Knowledge Repository 404 to make modifications to the current recipe. One feature of the Decision Maker 406 is the coherent exploitation of our multi-formatted knowledge sources. Presently, no existing mixed-initiative planner incorporates input from so many different data representations. The Decision Maker 406 makes a best guess as to the most appropriate change. The Decision Maker 406 determines this best guess is by calculating a weighted decision based on the following factors:

the reliability of the ML technique that generated the information, the statistical significance of the information (as based on the number of examples underlying the generalization), and the confidence that the technique places on the information.

For example, one extremely reliable technique may not have much data from which to make an inference, while another confident but less reliable technique uses a lot of data to generate its inference. The Knowledge Builder 402 will learn the reliability of each technique (using feedback through experimentation); the other two factors are provided by the component ML techniques.

The CWA modeling approach includes annotations of how to use the structured knowledge, and combined with the reliability, statistical significance and confidence factors, the Decision Maker 406 will be able to understand the knowledge, its applicability, and its tradeoffs to:

explore and evaluate the justifications for a decision, change or extend domain information to account for missing information, make changes to alternative actions to restrict or correct their applicability, as well as develop and incorporate new actions as necessary.

The CWA approach to the structured knowledge repository 404 provides a foundation for developing this multi-purpose interface. The current context overlay to the repository is partitioned from the general knowledge, allowing different interactions for different types of knowledge.

The Decision Maker 406 will interact with the expert user, the SKR 404 and the Knowledge Builder 402 to create and modify a recipe to create Advanced Recipes that meet processing conditions. In one embodiment, the Decision Maker enables the user to guide the decision-making process by allowing the best decision to be made and learning to make better decisions in the future, which in turn will create an overall high-quality plan that satisfies the user's desires.

Thus, the Decision Maker 406 allows the user to modify recipes using knowledge from different sources. The Decision Maker 406 also allows the user to explore, evaluate, correct and create actions. Furthermore, the Decision Maker 406 is able to use the reliability and quality of different knowledge sources on which to base decisions.

EXAMPLE SCENARIOS

In this section of the detailed description, several example scenarios are described. These scenarios provide examples for illustrative purposes only.

In the first scenario, Company A has an order to produce 85,000 kg of product X. The current recipe and equipment are designed to produce 100,000 kg. The engineers know that a linear scaling down of the recipe will not work. Typically about two to three recipe iterations are required to properly scale down a recipe. To reduce the risk of producing X at unacceptable quality, Company A produces 100,000 kg and stores the overrun in inventory. Maintaining inventory is expensive, and over time product quality may degrade, making it unusable. However, using the system and methods of the present invention, the excess product inventory and associated costs are avoided. In this case, Company A has installed an Enterprise Management software that forecasts production for 85,000 kg of product X. One embodiment of a knowledge management system according to the present invention is used to appropriately scale the recipe using the process scaling laws to achieve the same product quality and meet process constraints. The new recipe makes it possible to produce only the 85,000 kg of product X at the quality required for immediate sale, thus avoiding excess production inventory and costs to maintain this inventory.

In a second example scenario, Company D manufactures a product with critical quality constraints. Products that do not meet these constraints are either destroyed or sold for less. With current practices, including SPC, the quality can vary when raw materials change or catalyst degrades or scale-up doesn't take all the variables into account. Fifty batches per year (5%) are downgraded because Company D used the same recipe for all conditions. However, using the system and methods of the present invention a change in state of a process can be detected (such as catalyst degradation and equipment fouling) using the process data, analysis tools, engineering knowledge, and intermediate lab samples. The desired-state is then used to modify the recipe to produce consistent quality for subsequent batches.

In a third scenario, Company B wants to scale up product Y and its marketing group wants it to be in full production within 6 months. The process chemical engineers use information from the laboratory recipe, their experience, and trial-and-error methods to design a recipe that works for the pilot plant. The process engineers then use engineering judgment to scale up to production, using assumptions about the equipment that will be used. In the meantime, marketing reduces the time-to-market requirement by two months to gain market share. To meet the time requirement, engineering stops fine-tuning and makes the original recipe more conservative for production. In contrast, using the system and methods of the present invention, when the process engineers receive the first order to scale up product Y, they enter the laboratory recipe and desired-state into the structured knowledge base for context-specific goal knowledge. The knowledge management system builds empirical relationships and helps the process engineers design the recipe and scale up to production. All the while, the process engineers enter their observations and the engineers are able to scale up the recipe to production in under two months.

Conclusion. Example embodiments of the present invention allow capture and use of the underlying knowledge, including the desired product states, to modify and maintain recipes and as a result, making possible more consistent product quality, improved time-to-market, and reduced inventory. Example embodiments of the present invention also use of the diverse sources of knowledge described earlier to devise recipes and to adapt these recipes to changing production needs and processing conditions. Furthermore, example embodiments of the present invention also describe a unique knowledge-centric approach that provides recipes for scale-up, process planning, process changeover, and batch-to-batch monitoring and tuning. It will be able to augment its process knowledge by accessing a constantly expanding collection of batch data and recognizing how the production process and the product quality correlate with stated objectives and variations in production strategy parameters. The knowledge-centric approach is limited to batch process industries, and has wider applications in many domains such as continuous process industry, information documentation, economics, research and discovery of chemicals and drugs, and so on.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computerized method comprising:
   receiving a production recipe for producing a batch of product, wherein the production recipe includes a sequence of actions for combining ingredients of the batch of product;
   annotating one or more actions of the sequence of actions in the production recipe with a desired intention for the one or more actions;
   generating an advanced recipe as output, wherein the advanced recipe comprises the sequence of actions and the desired intention, and wherein the advanced recipe is used to enable tailoring of the production recipe to specific needs.

2. The computerized method of claim 1, wherein the tailoring of the production recipe to specific needs is changing the quantity of the product.

3. The computerized method of claim 1, wherein the tailoring of the production recipe is to meet specific plant or business needs.

4. The computerized method of claim 1, further comprising:
   analyzing post-production analysis results of the batch of product;
   generating rules and patterns based on the analysis results; and
   modifying the advanced recipe based on the rules and patterns.

5. A computerized method comprising:
   receiving a production recipe that includes a set of actions for combining ingredients of a batch of product;
   receiving knowledge associated with the batch of product from one or more sources; and
   generating through computer automated operations an advanced recipe comprising the set of actions and a purpose of an underlying process.

6. The computerized method of claim 5 further comprising modifying the advanced recipe.

7. The computerized method of claim 5 wherein the knowledge is received from a user.

8. A computerized method for controlling a production process, the method comprising:
   receiving data from multiple knowledge sources;
   storing the data in a structured knowledge repository; and
   modifying a recipe for a batch processing situation using the data stored in the knowledge repository, wherein the recipe contains steps and purposes, wherein the recipe is for producing a quantity of a product, and wherein the steps are steps for combining ingredients of the quantity of the product.

9. The computerized method of claim 8 wherein modifying the recipe further comprises using inputs from a user.

10. The computerized method of claim 8, wherein the product is selected from the group consisting of chemical products, food and beverage products, and pharmaceutical products.

11. A computerized system comprising:
 a Knowledge Builder to derive from multiple knowledge sources;
 a Structured Knowledge Repository to store and organize the knowledge, wherein the Structured Knowledge Repository organizes knowledge and provides links between specific pieces of information and the functional purposes to which the knowledge can be put; and
 a Decision Maker to use the knowledge stored in the structured knowledge repository to identify one or more modifications of recipe steps of a recipe, wherein the recipe steps are steps for combining ingredients of a quantity of a product.

12. The computerized system of claim 11 wherein the recipe is for a batch process.

13. The computerized system of claim 11 wherein the Knowledge Builder is to extract knowledge from multiple sources through one or more Machine Learning techniques.

14. The computerized system of claim 13 wherein the different Machine Learning techniques act independently from each other.

15. The computerized system of claim 14 wherein knowledge builder is scalable by adding additional the Machine Learning techniques.

16. The computerized system of claim 13 wherein the machine learning techniques are selected from the group consisting of: explanation-based learning, memory based learning, situation-dependent learning.

17. The computerized system of claim 11 wherein the Knowledge Builder is to receive feedback from a user.

18. The computerized system of claim 11 wherein the knowledge builder is scalable to incorporate new knowledge.

19. The computerized system of claim 11 wherein the knowledge builder is scalable to incorporate new knowledge extraction techniques.

20. The computerized system of claim 11 wherein the structured knowledge repository uses abstraction-decomposition space (ADS) techniques.

21. The computerized system of claim 11 wherein the Decision Maker is to assemble the knowledge into an answer to a query.

22. The computerized system of claim 21 wherein the answer to the query is in the form of a recipe modification that meets desired goals and constraints.

23. The computerized system of claim 11 wherein the Decision Maker is to display knowledge to a user.

24. The computer-readable medium of claim 23, wherein the method further comprises modifying the advanced recipe in response to a user.

25. A computer-readable medium having computer-executable instructions for a method of managing a production process, the method comprising:
 receiving one or more desired purposes for the production process;
 receiving a recipe, wherein the recipe is a set of actions for producing a quantity of a product, wherein the set of actions includes actions for combining ingredients of the quantity of product; and
 generating an advanced recipe comprising the set of actions and the one or more desired purposes for the production process.

26. A system comprising:
 a Knowledge Builder to extract a number of knowledge types from a number of sources, wherein one of the number of sources is a source based on a symbolic learning approach to extract reasons for an outcome of a step of a recipe and wherein a different one of the number of sources is a source based on an empirical approach to extract results based on what happened from a step of a recipe;
 a Structured Knowledge Repository to organize and store the number of knowledge types from the number of sources in a scaffolding structure, wherein an abstraction-decomposition technique is used to organize the number of knowledge types based on an analysis of a physical domain in which the steps of the recipe are executed and how functional purposes are to be achieved within constraints provided by the physical domain; and
 a Decision Maker to use the knowledge stored in the structured knowledge repository to identify one or more modifications of steps of the recipe.

27. The system of claim 26, wherein the symbolic learning approach includes an explanation-based learning approach.

28. The system of claim 26, wherein the empirical approach includes a memory based learning approach.

29. The system of claim 26, wherein the number of sources are independent of each other.

30. A computerized method comprising:
 extracting a number of knowledge types from a number of sources, wherein one of the number of sources is a source based on a symbolic learning approach to extract reasons for an outcome of a step of a recipe, and wherein a different one of the number of sources is a source based on an empirical approach to extract results based on what happened from a step of a recipe;
 storing the number of knowledge types from the number of sources in a scaffolding structure, wherein an abstraction-decomposition technique is used to organize the number of knowledge types based on an analysis of a physical domain in which the steps of the recipe are executed and how functional purposes are to be achieved within constraints provided by the physical domain; and
 identifying one or more modifications of the steps of the recipe based on the knowledge types.

31. The computerized method of claim 30, wherein the symbolic learning approach includes an explanation-based learning approach.

32. The computerized method of claim 30, wherein the empirical approach includes a memory based learning approach.

33. The computerized method of claim 30, wherein the number of sources are independent of each other.

34. A computer-readable medium having computer-executable instructions for a method comprising:
 extracting a number of knowledge types from a number of sources, wherein one of the number of sources is a source based on a symbolic learning approach to extract reasons for an outcome of a step of a recipe and wherein a different one of the number of sources is a source based on an empirical approach to extract results based on what happened from a step of a recipe;
 storing the number of knowledge types from the number of sources in a scaffolding structure, wherein an abstraction-decomposition technique is used to organize the number of knowledge types based on an analysis of a physical domain in which the steps of the recipe are executed and how functional purposes are to be achieved within constraints provided by the physical domain; and identifying one or more modifications of the steps of the recipe based on the knowledge types.

35. The computer-readable medium of claim 34, wherein the symbolic learning approach includes an explanation-based learning approach.

36. The computer-readable medium of claim 34, wherein the empirical approach includes a memory based learning approach.

37. The computer-readable medium of claim 34, wherein the number of sources are independent of each other.

\* \* \* \* \*

UNITED STATES PATENT AND TRADEMARK OFFICE
CERTIFICATE OF CORRECTION

| | | |
|---|---|---|
| PATENT NO. | : 6,947,917 B1 | Page 1 of 1 |
| APPLICATION NO. | : 09/549620 | |
| DATED | : September 20, 2005 | |
| INVENTOR(S) | : Anoop K. Mathur et al. | |

It is certified that error appears in the above-identified patent and that said Letters Patent is hereby corrected as shown below:

On the front page of the patent, at section 75, after "Tariq Samad, Minneapolis, MN (US)" please insert --, Dal Vernon Reising, Woodbury, MN (US), Chris Miller, St. Paul, MN (US) and Karen Haigh, Greenfield, MN (US)--.

Signed and Sealed this

Fifth Day of September, 2006

JON W. DUDAS
*Director of the United States Patent and Trademark Office*